Patented Sept. 15, 1953

2,652,401

UNITED STATES PATENT OFFICE 2,652,401

BENZOTHIAZOLE DERIVATIVES AND METHOD OF PRODUCTION

Norbert Steiger, Nutley, N. J., assignor to Hoffmann-La Roche Inc., Nutley, N. J., a corporation of New Jersey No Drawing. Application April 16, 1952, Serial No. 282,679

12 Claims. (Cl. 260—306)

This invention relates to 6-anilino-4-($\beta$-di-lower alkylaminoethoxy)-2-($\beta$-di-lower alkylaminoethylmercapto)benzothiazoles and the acid addition salts thereof, which, in the form of the free base, can be represented by the following general formula:

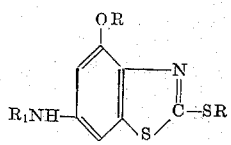

wherein R is $\beta$-di-lower alkylaminoethyl and R₁ is phenyl, lower alkyl- and halo-substituted phenyl. Compounds of this invention are trichomonacides and antifungal agents.

In general, the 6-anilino-4-($\beta$-di-lower alkylaminoethoxy) - 2 - ($\beta$-di-lower alkylaminoethylmercapto)benzothiazoles are prepared as follows: 6 - chloro-4-ethoxy-benzo-2,3-thiaza-1-thionium chloride is reacted with a member of the group consisting of aniline, lower alkyl-, and halo-substituted aniline to form the corresponding 6-analino - 4 - ethoxy-benzo-2,3-thiaza-1-thionium chloride. The latter is then reacted with carbon disulfide to produce the corresponding 2-mercapto-4-ethoxy-6-anilinobenzothiazole which is hydrolyzed with aluminum chloride in a suitable solvent, for example, chlorobenzene, to form the corresponding 2-mercapto-4-hydroxy-6-anilino-benzothiazole. The latter compound is reacted in the form of an alkali metal salt, for example, the sodium salt, with a $\beta$-di-lower alkylaminoethyl halide, for example, 1-diethylamino-2-chloro-ethane to produce the corresponding 6-anilino - 4 - ($\beta$-di-lower alkylaminoethoxy)-2-($\beta$-di-lower alkylaminoethylmercapto)benzothiazole which can be recovered from the reaction medium as the free base by removing the solvents, or as the acid addition salts thereof, for example, as a hydrochloride or hydrobromide, by passing hydrogen chloride or hydrogen bromide into the reaction medium.

The free bases readily yield acid addition salts with both organic and inorganic acids. Thus, by treating the bases with an equivalent amount of an acid, as, for example, hydrochloric, hydrobromic, sulfuric, phosphoric, nitric, acetic, propionic, caprylic, undecylenic, tartaric, and citric acids, the corresponding acid addition salts of the 6-anilino-4-($\beta$-di-lower alkylaminoethoxy) - 2 - ($\beta$-di-lower alkylaminoethylmercapto)benzothiazoles are obtained.

The following examples will serve to illustrate the preparation of the compounds embraced within the scope of the invention:

Example 1

A. 30 grams of 6-chloro-4-ethoxy-benzo-2,3-thiaza-1-thionium chloride were added to a solution of 22 grams of aniline in 130 cc. of acetic acid at 25–45° C. with stirring. Stirring was continued for 6 hours. The condensation mass was then poured into 600 cc. of a 20% sodium chloride solution and 13 cc. of concentrated hydrochloric acid. After stirring for 3 hours, the crystalline condensation product was filtered off and washed on the funnel with a 20% sodium chloride solution. The filter cake comprising 6-anilino - 4 - ethoxybenzo-2,3-thiaza-1-thionium chloride was then added with good agitation to a solution made up of 150 cc. of alcohol, 50 cc. of sodium hydroxide (40% solution), and 10 grams of sodium hydrosulfite. After addition of 100 cc. of water, the solution was heated to 60° C. for one-half hour, then at 80° C. for 1 hour. There was then added a solution of 20 cc. of carbon disulfide in 30 cc. of alcohol, and the resulting solution was heated and stirred for 1 hour to reflux. The excess carbon disulfide and the alcohol were then distilled off, and the residue was diluted with 500 cc. of water and filtered at 90° C. The filtrate was neutralized with about 80 grams of sodium bisulfite, whereupon a white crystalline precipitate comprising 2-mercapto-4-ethoxy-6-anilino-benzothiazole was obtained. Upon recrystallization from chlorobenzene, the compound melted at 206–207° C.

B. 25 grams of 2-mercapto-4-ethoxy-6-anilino-benzothiazole were stirred with 150 cc. of chlorobenzene. To the mixture were added 30 grams of anhydrous aluminum chloride, and the reaction mixture was then heated for 3 hours to the boil (130–133° C.) under reflux and good agitation. 100 grams of ice and 100 cc. of concentrated hydrochloric acid were then added, and the chlorobenzene removed by steam distillation. The residue was filtered and washed with water. It was a sandy, slightly yellowish, powder. The 2-mercapto-4-hydroxy-6-anilinobenzothiazole thus obtained can be purified by dissolving it in N sodium hydroxide solution containing a small amount of sodium hydrosulfite at room temperature, followed by filtration and neutralization with sodium bisulfite.

C. 15 grams of 2 - mercapto - 4 - hydroxy - 6 - anilinobenzothiazole, 250 cc. of chlorobenzene, 6.5 grams of sodium methylate, and 25 cc. of methanol were stirred together for one-half hour, and then about 90 cc. of the methanolchlorobenzene mixture were distilled off. To the residue, which contained the disodium salt of 2-mercapto - 4 - hydroxy - 6 - anilinobenzothiazole, were added 17 grams of 1-diethylamino-2-chloro-ethane, and the mixture was refluxed for 4 hours. There were then added at 90° C., 150 cc. of water and 5 cc. of sodium hydroxide (40% solution), and the mixture was stirred for 1 hour. It was then placed in a separatory funnel. The chlorobenzene layer was removed and dried over sodium sulfite. It was then concentrated in vacuo. The residue, comprising 6-anilino-4-(β-diethylaminoethoxy) - 2 - (β - diethylaminoethylmercapto)-benzothiazole, was dissolved in 100 cc. of methanol at 50–60° C. and filtered. To the filtrate were added 50 cc. of methanol-hydrogen chloride solution (containing 25% of hydrogen chloride). The reaction mixture was then concentrated to dryness in vacuo. The 6-anilino-4-(β-diethylaminoethoxy) - 2 - (β - diethylaminoethylmercapto)-benzothiazole trihydrochloride was obtained as yellow crystals. The compound is very soluble in water and methanol, and is soluble in ethanol and isopropanol. On crystallization from ethanol-acetone, it melted at 112° C.

*Example 2*

A. 62 grams of 6-chloro-4-ethoxy-benzo-2,3-thiaza-1-thionium chloride were reacted with 56 grams of 3-chloroaniline to produce 6-(3-chloroanilino)-4-ethoxy - benzo-2,3-thiaza-1-thionium chloride which was then converted to 2-mercapto-4-ethoxy - 6 - (3-chloroanilino)benzothiazole, according to the procedure described in Example 1 (A).

B. 38 grams of 2-mercapto-4-ethoxy-6-(3-chloroanilino)benzothiazole in 250 cc. of chlorobenzene were reacted with 40 grams of aluminum chloride in the same manner as described in Example 1 (B), whereupon 2-mercapto-4-hydroxy-6-(3-chloroanilino)benzothiazole was produced.

C. 16.5 grams of 2-mercapto-4-hydroxy-6-(3-chloroanilino)benzothiazole, 7 grams of sodiummethylate, and 17 grams of 1-diethylamino-2-chloroethane in 250 cc. of chlorobenzene were reacted in the same manner as described in Example 1 (C) to produce 6-(3-chloroanilino)-4-(β-diethylaminoethoxy)-2-(β - diethylaminoethylmercapto)benzothiazole and the trihydrochloride thereof. The trihydrochloride was obtained in the form of yellowish crystals which were very soluble in water and soluble in alcohol and melted at 138–140° C.

*Example 3*

A. 37 grams of 2,4-dichloroaniline were dissolved in 130 cc. of glacial acetic acid with stirring. When the solution was complete, 30 grams of finely ground 6-chloro-4-ethoxy-benzo-2,3-thiaza-1-thionium chloride were added in small portions within one-half hour. The mixture was stirred for 8 hours. 600 cc. of 20% sodium chloride and 13 cc. of concentrated hydrochloric acid were then added and stirring was continued for 3 hours. The precipitate was filtered off, washed with a little 20% sodium chloride solution and sucked dry. The filter cake comprising 6-(2,4-dichloroanilino)-4-ethoxy-benzo - 2,3 - thiaza-1-thionium chloride was added to a solution containing 150 cc. of ethanol, 50 cc. of 40% sodium hydroxide solution, and 10 grams of sodium hydrosulfite. The mixture was heated at 60° C. for 1½ hours. 100 cc. of water were added, and heating was continued at 80° C. for 1½ hours. After cooling to room temperature, 50 cc. of ethanol and 20 cc. of carbon disulfide were slowly added. The mixture was refluxed in a water bath for 2 hours. The solvents were then distilled off, and 80 grams of sodium chloride were added to the aqueous residue. The precipitate was filtered off, washed with a little salt water and sucked dry. The filter cake was suspended in 2 liters of water, 15 cc. of 40% sodium hydroxide were added, and the mixture was heated to 90° C. The mixture was filtered and acidified to Congo blue with concentrated hydrochloric acid. After cooling, the precipitate was filtered off, washed with ice water, and dried in vacuo. The product thus obtained was 2-mercapto-4-ethoxy-6-(2,4-dichloroanilino)benzothiazole.

B. 34 grams of 2-mercapto-4-ethoxy-6-(2,4-dichloroanilino)benzothiazole were suspended in 200 cc. of chlorobenzene. 35 grams of aluminum chloride were slowly added, and the mixture was refluxed at 132° C. for 3½ hours. After cooling to 50° C., 100 grams of crushed ice were added in portions, followed by 15 cc. of concentrated hydrochloric acid. The mixture was steam distilled and 25 grams of salt were added to the aqueous residue which was then cooled in ice. The precipitate was filtered off and sucked dry. It was then stirred with a solution of 30 cc. of 40% sodium chloride and 6 grams of sodium hydrosulfite in 450 cc. of water. The mixture was filtered into a solution of 48 grams of sodium bisulfite in 180 cc. of water with stirring. After cooling in ice, the precipitate was filtered off, washed with ice water, and dried in vacuo. The compound thus obtained was 2-mercapto-4-hydroxy-6-(2,4-dichloroanilino)benzothiazole.

C. 18 grams of 2-mercapto-4-hydroxy-6-(2,4-dichloroanilino)benzothiazole were suspended in 300 cc. of chlorobenzene, and 7 grams of sodium methylate and 50 cc. of methanol were added, and the mixture refluxed at 70° C. for 1 hour. The mixture was distilled until the temperature reached 133° C. After cooling to room temperature, 150 cc. of chlorobenzene and 75 grams of 1-diethylamino - 2 - chloro-ethane were added. The mixture was refluxed at 133° C. for 3 hours. It was then allowed to cool to 80° C. and 150 cc. of water and 10 cc. of 40% sodium hydroxide solution were added. After stirring for ½ hour, the mixture was filtered and the chlorobenzene phase was separated, and the aqueous phase was extracted with two 100 cc. portions of chlorobenzene. The combined chlorobenzene extracts were dried over sodium sulfite. The solution was filtered and concentrated in vacuo to an oil comprising 2-(β-diethylaminoethylmercapto)-4 - (β-diethylaminoethoxy)-6-(2,4 - dichloroanilino)-benzothiazole. The oil was taken up in 200 cc. of methanol and filtered. The solution was cooled in ice and 50 cc. of 15% hydrogen chloride and methanol were slowly added. The mixture was concentrated in vacuo to dryness, and the residue was dried in vacuo over sodium hydroxide. The compound thus obtained was 2-(β-diethylaminoethylmercapto)-4-(β - diethylamino - ethoxy) - 6 - (2,4 - dichloroanilino)benzothiazole trihydrochloride.

*Example 4*

A. 25 grams of p-toluidine were dissolved in 130 cc. of glacial acetic acid at 25° C. with stirring. When solution was complete, 30 grams of finely ground 6-chloro - 4 - ethoxy - benzo-2,3-thiaza-1-thionium chloride were added in small portions within one-half hour. The temperature rose to 35° C. The mixture was then stirred for 8 hours at room temperature. 600 grams of 20% sodium chloride and 13 cc. of concentrated hydrochloric acid were then added, and stirring was continued for 3 hours. The purplish brown precipitate was filtered off, washed with a small amount of 20% sodium chloride solution and sucked dry. The filter cake which comprised 6-(p-toluino) - 4 - ethoxy-benzo - 2,3 - thiaza-1-thionium chloride was added to a solution containing 150 cc. of ethanol, 50 cc. of 40% sodium hydroxide and 10 grams of sodium hydrosulfite.

The mixture was heated to 60° C. with stirring for 1 hour. 100 cc. of water were added and heating was continued for 1½ hours at 80° C. After cooling the reaction medium to room temperature, 50 cc. of ethanol and 25 cc. of carbon disulfide were added, and the mixture was refluxed in a water bath for 1½ hours. The solvents were then distilled off. 80 grams of sodium chloride were added, and the residue was cooled in ice water then filtered off and washed with a little salt water. The filter cake was sucked dry and then suspended in 750 cc. of hot water. 25 grams of 40% sodium hydroxide solution were added and the mixture was heated to 95° C. It was then filtered hot, and the filtrate was acidified to Congo blue with concentrated hydrochloric acid, and the mixture was cooled in ice. The precipitate which formed was filtered off, washed with ice water, and sucked dry. The 2-mercapto-4-ethoxy-6-(p-toluino)- benzothiazole thus obtained was dried in vacuo.

B. 29 grams of 2-mercapto-4-ethoxy-6-(p-toluino)benzothiazole were suspended in 200 cc. of chlorobenzene. 35 grams of aluminum chloridge were slowly added, and the mixture was refluxed at 131° C. for 3½ hours. The reaction mixture was permitted to cool to room temperature, and 100 cc. of crushed ice were added in small portions, followed by 10 cc. of concentrated hydrochloric acid. The chlorobenzene was steam distilled, and the residue was left standing at 4° C. for about 16 hours. The precipitate that formed was filtered off and sucked dry. It was suspended in a mixture of 450 cc. of water, 40 cc. of 40% sodium hydroxide solution, and 6 grams of sodium hydrosulfite. After stirring the mixture for one-half hour at room temperature, it was filtered into a stirred solution of 48 grams of sodium bisulfite and 180 cc. of water. The suspension was cooled in ice, and the precipitate was filtered off. After washing with a little ice water, the precipitate was sucked dry and dried in vacuo. The compound thus obtained was 2-mercapto - 4 - hydroxy - 6 - (p - toluino)benzothiazole.

C. The 2-mercapto-4-hydroxy-6-(p-toluino)-benzothiazole obtained as described above was suspended in 250 cc. of chlorobenzene. 7 grams of sodium methylate and 50 cc. of methanol were added. The mixture was refluxed at 71° C. for 1 hour. The methanol was distilled off, and distillation was continued until the temperature reached 134° C. After cooling to room temperature, 150 cc. of chlorobenzene were added, followed by the addition of 20 grams of 2-diethylamino-1-chloro-ethane. The mixture was then refluxed at 134° C. for 4 hours and was allowed to cool to 60° C. 150 cc. of water and 15 cc. of 40% sodium hydroxide were added. After stirring for one-half hour, the mixture was filtered and the chlorobenzene phase was separated and the aqueous phase was extracted with two portions of 150 cc. each of benzene. The combined chlorobenzene extracts were dried over sodium sulfate. The sodium sulfate was filtered off and the filtrate was concentrated in vacuo to an oil comprising 2-(β-diethylaminoethylmercapto)-4-(β - diethylaminoethoxy) - 6 - (p - toluino)-benzothiazole. The oil was taken up in 150 cc. of methanol and filtered. The filtrate was cooled in ice, and 50 cc. of 15% hydrogen chloride in methanol were added in portions. The mixture was concentrated in vacuo, and the residue was dried in vacuo over sodium hydroxide. The compound thus obtained was 2 - (β - diethylaminoethylmercapto) - 4 - (β - diethylaminoethoxy) - 6-(p-toluino)benzothiazole trihydrochloride.

I claim:

1. A process which comprises reacting 6-chloro - 4 - ethoxy - benzo - 2,3 - thiaza - 1 - thionium chloride with a member of the group consisting of aniline, halo-substituted aniline, and lower alkyl substituted aniline so as to produce the corresponding 6 - anilino - 4 - ethoxy-benzo - 2,3 - thiaza - 1 - thionium chloride, reacting the latter with carbon disulfide to form the corresponding 2 - mercapto - 4 - ethoxy - 6 - anilino-benzothiazoles, hydrolyzing the latter to form the corresponding 2-mercapto-4-hydroxy-6-anilino-benzothiazoles and reacting the latter with a 2-di-lower alkylamino-1-halo-ethane so as to produce the corresponding 6-anilino-4-(β-di-lower alkylaminoethoxy) -2-(β-di-lower alkylaminoethylmercapto) -benzothiazoles.

2. A process which comprises reacting a 2-mercapto-4-hydroxy-benzothiazole substituted in the 6-position with a radical selected from the group consisting of anilino, lower alkylanilino, and haloanilino, in the form of its alkali metal salt, with a 2-di-lower alkylamino-1-halo-ethane so as to produce the corresponding 6-anilino-4-(β-di-lower alkylaminoethoxy) -2-(β-di-lower alkylaminoethylmercapto) benzothiazole.

3. A process which comprises reacting 2-mercapto - 4 - hydroxy - 6 - anilino - benzothiazole in the form of its sodium salt with 2-diethylamino-1-chloroethane.

4. A process which comprises reacting 2-mercapto - 4 - hydroxy - 6 - (3 - chloroanilino) - benzothiazole in the form of the sodium salt with 2-diethylamino-1-chloroethane.

5. A process which comprises reacting 2-mercapto - 4 - hydroxy - 6 - (2,4 - dichloroanilino)benzothiazole with 2 - diethylamino - 1 - chloroethane.

6. A process which comprises reacting 2-mercapto - 4 - hydroxy - 6 - (p-toluino) - benzothiazole with 2-diethylamino-1-chloroethane.

7. A compound selected from the group consisting of 4-(β-di-lower alkylaminoethoxy)-2-(β-di-lower alkylaminoethylmercapto)benzothiazoles which contain in the 6-position a radical selected from the group consisting of anilino, lower alkylanilino, and haloanilino radicals, and the acid addition salts of the aforesaid compounds.

8. 6 - anilino - 4 - (β - diethylaminoethoxy) - 2 - (β - diethylaminoethylmercapto) - benzothiazole.

9. 6 - anilino- 4 - (β - diethylaminoethoxy) - 2 - (β - diethylaminoethylmercapto) - benzothiazole trihydrochloride.

10. 6 - (3 - chloroanilino) - 4 - (β - diethylaminoethoxy) - 2 - (β - diethylaminoethylmercapto)benzothiazole.

11. 6 - (2,4 - dichloroanilino) - 4 - (β - diethylaminoethoxy) - 2 - (β - diethylaminoethylmercapto)benzothiazole.

12. 2 - (β - diethylaminoethylmercapto) - 4-(β-diethylaminoethoxy)-6-(p-toluino)-benzothiazole.

NORBERT STEIGER.

References Cited in the file of this patent

UNITED STATES PATENTS

| Number | Name | Date |
|---|---|---|
| 1,847,514 | Herz et al. | Mar. 1, 1932 |